United States Patent [19]  [11] 3,927,187
Luhleich et al.  [45] Dec. 16, 1975

[54] METHOD OF MAKING SHAPED CARBONACEOUS BODIES

[75] Inventors: Hartmut Luhleich, Duren; Hubertus Nickel; Francesco Dias, both of Julich, all of Germany

[73] Assignee: Kernforschungsanlage JULICH GmbH, Julich, Germany

[22] Filed: June 29, 1972

[21] Appl. No.: 267,479

[30]    Foreign Application Priority Data
       June 2, 1971    Germany............................ 2133044

[52] U.S. Cl.................................. 423/448; 264/29
[51] Int. Cl............................................ C01b 31/04
[58] Field of Search ...... 423/448, 449, 445; 264/29, 264/69, 105, 109, 38; 106/281, 56; 260/38

[56]          References Cited
              UNITED STATES PATENTS
1,037,901    9/1912    Hansen ................................ 264/29
1,891,979    12/1932   Hanauer ............................... 106/56
2,709,660    5/1955    Larson et al........................... 106/56
2,870,031    1/1959    Benziger .............................. 106/56
3,084,394    4/1963    Bickerdike et al..................... 264/29
3,346,678    10/1967   Ohlgren ............................... 264/29
3,519,593    7/1970    Bolger................................. 260/38 X
3,634,569    1/1972    Emanuelson et al. ............... 264/105

*Primary Examiner*—Edward J. Meros
*Attorney, Agent, or Firm*—Karl F. Ross; Herbert Dubno

[57]            ABSTRACT

Shaped graphitic or graphite-like carbonaceous bodies are produced by forming binder-coated particles of a carbonaceous filler in a slurry, shaping the slurry or paste of the particles to the desired configuration, drying and cokefying the shaped body. The system is suitable for the production of graphitic structures for use in high-temperature gas-cooled nuclear reactors, as casting molds and the like.

1 Claim, 1 Drawing Figure

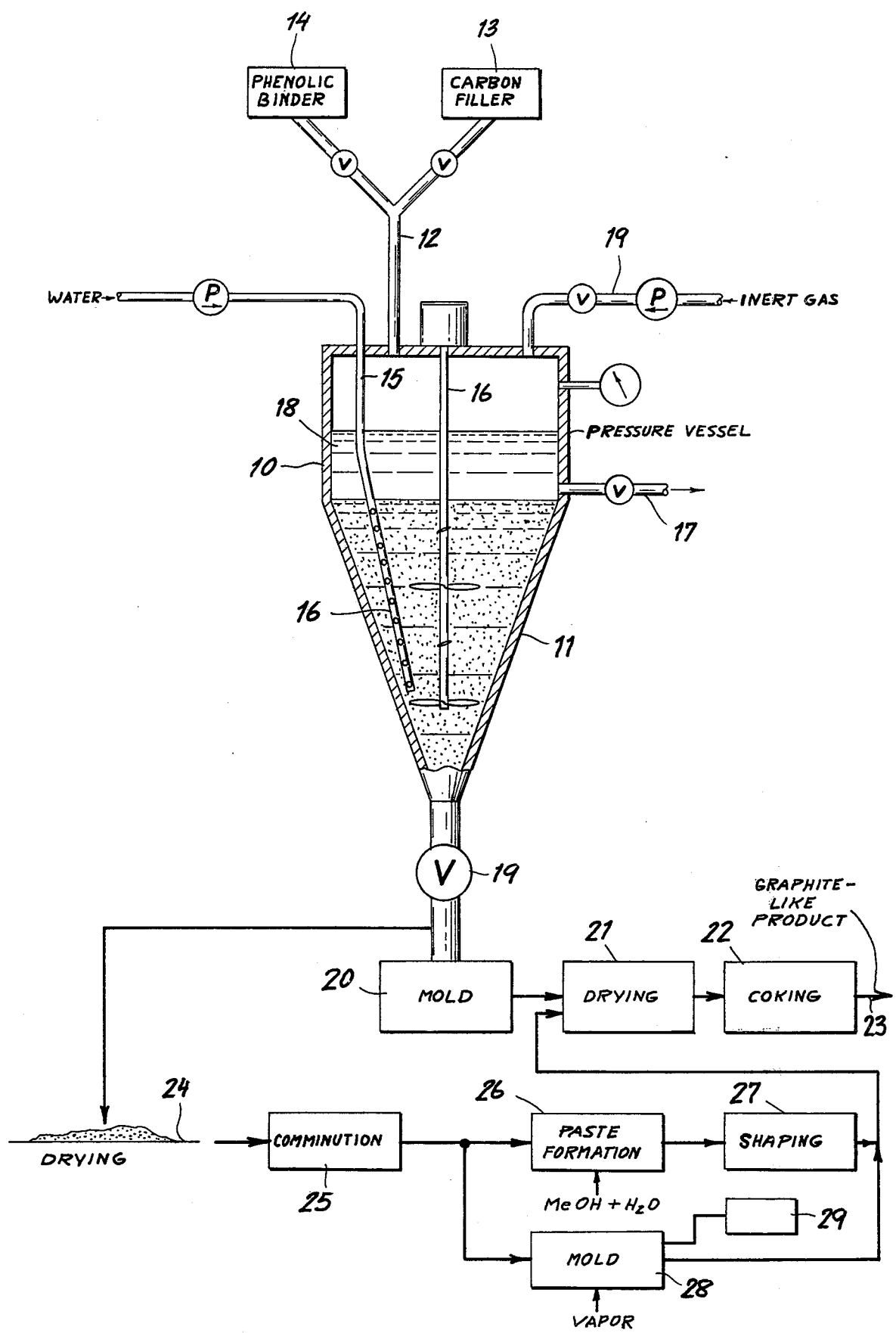

METHOD OF MAKING SHAPED CARBONACEOUS BODIES

FIELD OF THE INVENTION

Our present invention relates to a method of producing shaped carbonaceous bodies and, more particularly, to the production of graphitic or graphite-like bodies (synthetic-graphite bodies) having good mechanical properties at relatively low cost.

BACKGROUND OF THE INVENTION

In the art of forming carbonaceous bodies, it is frequently desirable to use carbonaceous materials which may be waste products or byproducts of other processes as a source of graphitic carbon although the carbonaceous material may be in an amorphous or nongraphitic state. For example, petroleum coke, carbon black and even electrically precipitated or natural graphite are desirable sources of graphitic material for the production of shaped graphite or graphite-like bodies.

Graphite bodies have been employed heretofore for many purposes and in various industries. For example, high-temperature gas-cooled nuclear reactors may make use of graphitic bodies for the structure of the nuclear-reactor core, as sheaths for nuclear-fuel elements, as enclosures for fertile elements in breeder reactions, and as components of nuclear fuel or breeder particles. In the metallurgical industry and in the glass-making field, graphite molds or molds lined with graphite or graphite-like materials are used for casting. In general, graphitic bodies have been employed whenever high-temperature processes may be involved because they have a refractory and generally inert character. In nuclear reactors especially, they have proved to be desirable because of the neutron cross-section of graphitic materials and little tendency to produce reaction products which interfere with the operation of a nuclear reactor.

Common methods of producing graphite-like bodies involve the extrusion or ram-pressing of synthetic graphite or graphite-like products to shape them into the desired configuration. These systems frequently require after-treatment of the graphite-like bodies and make use of relatively expensive equipment because it is difficult to impart a well-defined shape to the graphitic materials and at the same time provide the high compressive strength and other desirable mechanical properties.

OBJECTS OF THE INVENTION

It is, therefore, the principal object of the present invention to provide a method of making shaped bodies of synthetic graphite or materials similar to synthetic graphite, i.e. to produce graphite-like bodies, whereby the disadvantages of earlier systems can be avoided and relatively intricate bodies can be made with good mechanical characteristics at relatively low cost.

It is another object of the invention to provide an improved method of making graphite-like bodies of uniform or homogeneous cross-section, high compressive strength and complex configuration without the disadvantages of ram-press systems as described above.

Yet another object of the invention is to provide a method of making shaped carbonaceous bodies, especially graphite-like bodies for use in nuclear reactors and as casting molds, without the use of pressure and with high structural strength.

SUMMARY OF THE INVENTION

These objects and others which will become apparent hereinafter are attained, in accordance with the present invention, in a system for producing graphite-like bodies (synthetic-graphite bodies) which comprises the step of forming a viscous slurry of particles in a liquid medium, e.g. as a flowable or kneadable mass, shaping this mass to the desired configuration, drying the mass and thereafter cokefying the mass, the solids of which consist of particles of a carbonaceous filler coated with particles of a carbonizable binder. According to the principles of the present invention, filler particles of petroleum coke, electrically produced graphite, natural graphite, carbon black or carbonaceous particles are coated with synthetic-resin binders such as phenol-formaldehyde resins or other carbonizable binders such as pitch or tar and are provided in the form of a flowable or nonflowable slurry.

During drying, the mass, which is preferably shaped in a mold, produces a solid "green" body which, upon cokefying at temperatures of 800°C and above, yields a homogeneous rigid structure of the configuration originally imparted to the shapable mass. The latter can be employed as a more or less flowable or viscous product which may be sufficiently fluid to be cast or may be somewhat more pasty so as to be shapable by manipulative molding or kneading as in the case of clay. Combinations of the two shaping steps may of course also be employed. As a consequence, the mass may be shaped into a wide variety of complex configurations.

According to another feature of the invention, the mass includes a liquid phase in which the binder is only limitably soluble and swellable, the liquid phase, e.g. water, serves as a vehicle for shaping the particulate mass. Advantageously, the powder is obtained by drying the slurry of a binder and the aforementioned filler solids as described above.

Still another feature of the invention resides in moistening the powder after it has been shaped, e.g. in the mold, with vapor of a boiling liquid in which the binder is completely or partially soluble, whereupon the shaped body is dried and cokefied in the manner described. The powder is, in this case as well, produced by drying the binder/solids slurry mentioned earlier. The body may have an especially high density if the powder, preferably before moistening although the step may be carried out simultaneously with or subsequent to moistening, is densified by vibration in the mold. The liquid vehicle is then preferably a vaporizable liquid in which the binder is soluble and which is used to treat the powder mass in the form of a vapor. Best results are obtained when the binder is present in an amount in excess of 25% by weight in the slurry.

According to the invention, the filler materials, such as electrically-produced synthetic graphite, natural graphite, milled petroleum coke and carbon black are mixed with binders such as pitch, tar and phenol-formaldehyde resins by dissolving the binder first in a liquid in which the filler is slurried and then introducing this liquid and the slurry into a liquid vehicle in which the binder is insoluble or only partly soluble to produce an emulsion of the binder in the form of the coating upon the solid particles which settle and, after decanting of the excess liquid, form a slurry which may be dried and converted into the powder. The system, described in the commonly assigned copending application Ser. No. 267,480 filed June 29, 1972 in which we are coinventors, produces particles in which the solid grains are substantially uniformly coated with the binder.

The shaped bodies produced in accordance with the present invention have an exceptionally high degree of homogeneity.

Another advantage of the process according to the present invention is that the porosity of the finished body corresponds, in percentage, approximately to the total binder component and thus the body is suitable as an impregnatable structure for any purpose in which impregnation is desired. For example, it may be desirable to impregnate the body with conductive substances in order to increase the electrical conductivity, synthetic graphite bodies prepared with binders being notoriously of poor conductivity.

DESCRIPTION OF THE DRAWING

The above and other objects, features and advantages of the present invention will become more readily apparent from the following description, reference being made to the accompanying drawing the sole FIGURE of which is a flow diagram illustrating the invention and showing parts of the apparatus in vertical cross-sections.

SPECIFIC DESCRIPTION

In the drawing, we show an apparatus for carrying out the present invention according to one embodiment thereof. The apparatus may comprise a vessel 10 having a conical base 11 forming a sedimentation chamber for the coated solid particles which may be used, in accordance with the invention, to produce graphite-like structures. The vessel 10, 11 may be provided with an inlet duct 12 through which a carbonaceous filler 13, such as comminuted petroleum coke, electrically produced graphite or natural graphite or carbon black is fed. The phenol-formaldehyde binder from a reservoir 14, in a solvent as will be apparent from the specific Examples given below is metered into mixture with the carbonaceous filler and discharged via conduit 12 into the vessel 10, 11. Water may be introduced into the latter via a line 15 and a dispersing nozzle 16, the latter emulsifying the contents of the vessel. A stirrer 16' may be provided to form the initial mixture of the particles, binder and any other liquid vehicle and an outlet 17 of the vessel serves to decant any supernatant excess liquid 18 following sedimentation of the coated particles. An inert gas at 19 can be supplied to the vessel as well.

The slurry is discharged via a valve 19 directly into a mold 20 whereupon the slurry is dried at 21 and cokefied at 22. The graphite-like product is recovered at 23. The slurry may, however, be cast upon a surface at 24 and dried to form a coke which is comminuted at 25 and, as a powder, is formed into a paste at 26, e.g. by mixture with a liquid vehicle containing a solvent for the binder. The paste may then be shaped at 27 and subjected to the drying and cokefying steps. The powder may also be placed directly in a mold 28 which is exposed to the solvent vapor and then subjected to drying and cokefying. The mold 28 may be vibrated as represented at 29.

SPECIFIC EXAMPLES

EXAMPLE I 20 g of phenol-formaldehyde resin is dissolved in 100 ml of methanol and 80 g of petroleum-coke filler is then dispersed in the liquid phase. The petroleum-coke filler has a particle size of 50 to 100 microns. The slurry is introduced into a vessel with a conical base to which a dispersing nozzle is connected by a valve. The nozzle is immersed in the liquid within the vessel which is charged at a pressure of 5 atmospheres gauge with an inert gas (e.g. nitrogen). When the valve is open, 1000 ml of pure water is injected into the vessel and dispersed therein to form an emulsion of the slurry in the water. During emulsification the temperature is kept at a maximum of 12°C.

The finely divided particles which settle from the system are grains of the filler coated with the phenol-formaldehyde binder. The supernatant excess liquid is decanted and the remaining slurry is spread upon a plate, dried and pulverized. The binder proportion in the resulting mass is about 40% by weight and the solids are made into a pasty mass by the addition of 15 volume percent of methanol containing water. The paste is thoroughly blended and shaped in a mold. The body is then dried at about 105°C until weight loss terminates and is then coked at a temperature above 800°C. Cokefication is completed when the volatile components of heating of the phenol-formaldehyde resin are no longer given off. The body is found to have a homogeneous structure, high mechanical strength and faithful conformity to the mold. It is particularly suitable for use as a sheath for the nuclear fuel of a high-temperature gas-cooled nuclear reactor in which the body has a spherical configuration.

EXAMPLE II 10 g of the powder produced in Example I, containing 40% by weight binder, is vibrated in a ceramic mold and is treated with methanol vapor from boiling methanol in a closed vessel for a period of 30 minutes. The resulting green body, slightly shrunk, is thereafter dried and coked as described. Results similar to those previously described were obtained.

EXAMPLE III

The procedure of Example I was followed except that the coated particles with adherent liquid without powdering was cast in the mold, dried and cokefied. Again results similar to those previously described were obtained.

EXAMPLE IV

Examples I, II and III were each carried out with the following ratios of components with equivalent results:
  a. 15 g phenol-formaldehyde resin 85 g electro graphite (particle size 50 to 100 microns);
  b. 25 g pitch 75 g natural graphite comminuted to a particle size of 50 to 100 microns;
  c. 20 g phenol-formaldehyde resin 80 g carbon black (particle size about 50 microns).

All of the parameters were the same as those given in Examples I – III. Cokefication was carried out as described in *Carbon and Graphite Handbook*, Charles L. Mantell, Intersience Publishers, New York, 1968.

We claim:

1. A method of making a graphitic body, comprising the steps of:
a. coating particles with a particle size of 50 to 100 microns of petroleum coke, electrically produced graphite, natural graphite or carbon black with a binder selected from the group which consists of pitch, tar or synthetic resin in a liquid mixture consisting of methanol as a solvent for said binder and water, thereby producing a slurry of binder-coated particles;
b. drying the slurry of binder-coated particles and comminuting the dried slurry to produce a powdered mass of binder-coated particles;
c. shaping said powder mass of binder-coated particles in a mold;
d. treating the mass in said mold with methanol vapor;
e. thereafter drying the shaped mass of binder-coated particles; and
f. cokefying the dried shaped mass.

* * * * *

UNITED STATES PATENT AND TRADEMARK OFFICE
CERTIFICATE OF CORRECTION

PATENT NO. : 3,927,187
DATED : December 16, 1975
INVENTOR(S) : Hartmut Luhleich et al.

It is certified that error appears in the above—identified patent and that said Letters Patent are hereby corrected as shown below:

In the heading, line [30], for "June" read -- July -- .

Signed and Sealed this

Seventh Day of December 1976

[SEAL]

Attest:

RUTH C. MASON
*Attesting Officer*

C. MARSHALL DANN
*Commissioner of Patents and Trademarks*